Dec. 8, 1953 J. H. VAN WAGENINGEN ET AL 2,662,173

RADIO RECEIVING CIRCUIT WITH REFLEX MEANS

Filed Dec. 26, 1951

INVENTORS
Johan Hendrik Van Wageningen
Jan Schreur
By Fred M Vogel
Agent

Patented Dec. 8, 1953 2,662,173

UNITED STATES PATENT OFFICE 2,662,173

RADIO RECEIVING CIRCUIT WITH REFLEX MEANS

Johan Hendrik van Wageningen and Jan Schreur, Eindhoven, Netherlands, assignors to Hartford National Bank and Trust Company, Hartford, Conn., as trustee Application December 26, 1951, Serial No. 263,208

Claims priority, application Netherlands January 20, 1951

3 Claims. (Cl. 250—20)

Figure 1:
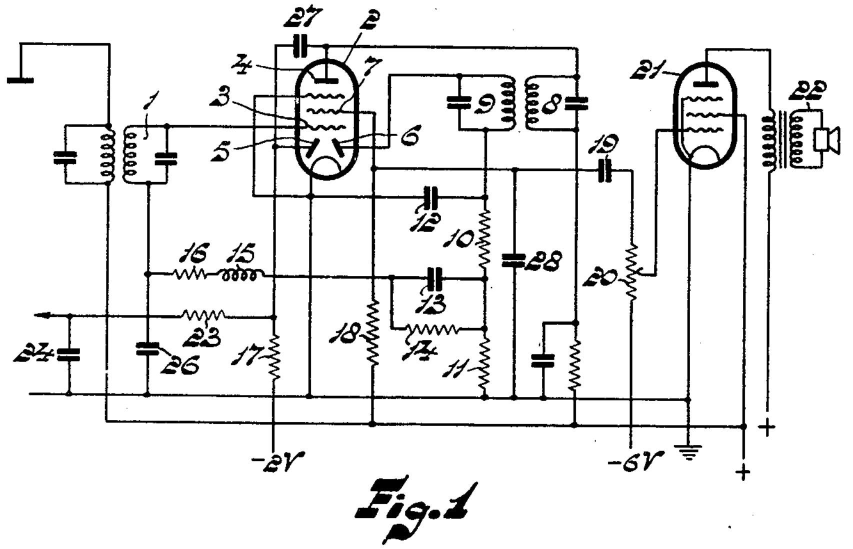

The invention relates to a radio receiving circuit-arrangement including a high-frequency or intermediate-frequency amplifying tube, which serves at the same time as an amplifier for low-frequency oscillations derived by detection from the amplified high-frequency or intermediate-frequency oscillations, by supplying the low-frequency oscillations occurring across a resistor in the detector circuit to the input circuit of the tube.

Receiving circuit-arrangements of this kind, so-called reflex circuit-arrangements are known. Reflex circuit-arrangements have, in general, for their object to reduce the number of amplifying tubes. Such arrangements are limited in usefulness because they become comparatively complicated, as particular measures are necessary if undesirable coupling between the various circuits is to be avoided. It is therefore difficult to render the reception completely free from distortion. Strong distortion may occur at large modulation depths of the high-frequency or intermediate-frequency signal, if the ratio between the alternating-current resistance and the direct-current resistance of the diode circuit is considerably smaller than unity, as is usually the case with reflex receivers. The term "alternating-current resistance of the diode circuit" is to be understood to mean here the resistance of the diode load, viewed from the diode terminals. The direct-current resistance is to be understood to mean the corresponding value for direct-current.

Many reflex receivers furthermore have a limitation in that even if the gain control, directly active on the detector circuit as is conventional, is adjusted to the minimum value, a strongly distorted signal is produced. This signal is the so-called residual signal, which is produced because the high-frequency or intermediate-frequency signal is already detected in the tube to a certain extent. The coupling between the detector circuit and the input circuit of the tube gives often rise to troublesome phenomena, which are known under the names of "flop" and "motorboating." The first phenomenon occurs when strong signals are received, more particularly if a strong signal is received during tuning; the strong voltage variations then produced across the detection resistor cause the tube to be overloaded. The second phenomenon is created by generation of a relaxation oscillation. In the conventional circuit-arrangement, in which the low-frequency signal, which is fed back, is adjusted by means of a gain control, which is at the same time the detection resistor, the so-called reflex motorboating may occur, the low-frequency signal then becoming so strong that the tube is overloaded and the intermediate-frequency amplification is periodically interrupted.

Figure 2:
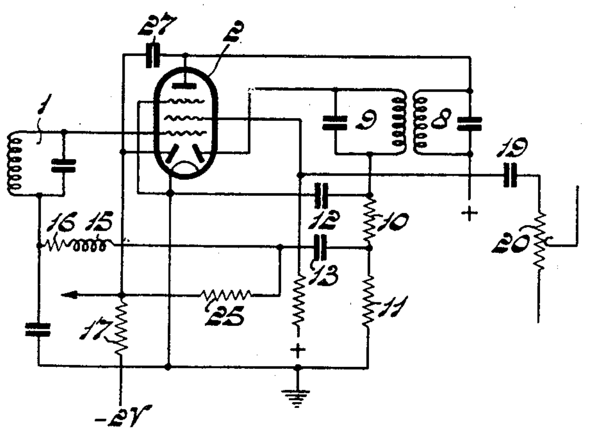

The object of the invention is to provide a simple circuit-arrangement, in which these phenomena are substantially eliminated without sacrificing output energy. In order that the invention may be more clearly understood and readily carried into effect, it will now be described more fully with reference to the accompanying drawing, in which:

Fig. 1 shows one embodiment of a circuit-arrangement according to the invention; and Fig. 2 shows a modification thereof.

In the circuit-arrangement shown in Fig. 1 the low-frequency signal is amplified in a tube which amplifies the intermediate-frequency signal at the same time. The intermediate-frequency signals are supplied to the input circuit 1, which constitutes the secondary circuit of an intermediate-frequency band-pass filter, which is connected to the anode of a preceding intermediate-frequency amplifying tube or a mixer. The signals produced across the circuit 1 are operative between the control grid 3 and the cathode of a tube, shown in the form of a duodiode-pentode 2. The amplified intermediate frequency signals occur across the circuit 8 included in the anode circuit and forming an intermediate-frequency band-pass filter together with the circuit 9, with which it is inductively coupled. The circuit 9 is connected both to the diode anode 6 and through the series combination of two resistors 10 and 11 to the chassis, to which also the cathode of the tube is connected. Consequently the low-frequency signal produced by detection occurs across the circuit of the series resistors 10 and 11. The capacitor 12 has a low impedance for the intermediate-frequency oscillations. From the common point of the resistors 10 and 11 are taken the low-frequency voltages which are to be amplified again in the tube 2, these voltages being supplied to the grid-circuit of the tube 2 of a series network formed by a capacitor 13 which is connected in series with the choke 15 and the resistor 16. A resistor 14 shunts capacitor 13. A capacitor 26 is connected between the point of the circuit remote from the control-grid and the chassis and constitutes substantially a short-circuit for the intermediate-frequency oscillations and a comparatively high impedance for the low-frequency oscillations.

The second diode including the anode 5 serves to produce a direct voltage varying in the same sense as the mean carrier-wave amplitude and supplied, as an automatic gain control voltage through a resistor 23 to the grid of one or more high-frequency or intermediate-frequency tubes. This is effected by connecting the anode 4 through a capacitor 27 to the said diode-anode, the said anode-diode being connected at the same time to a point being at a potential of, for example, —2 v. with respect to the grounded chassis. The capacitor 24 and the resistor 23 serve in the usual manner for smoothing the gain-control voltage.

The amplified low-frequency oscillations are taken from the screen-grid 7 of the tube 2 through a capacitor 19 and a resistor 18 and are supplied through the capacitor 19 to the resistor 20, which is provided with a sliding contact. The low-frequency oscillations, whose strength may be manually adjusted by means of the sliding contact, are supplied to the first grid of the final amplifying pentode 21, to the anode circuit of which the reproducer 22 is connected. The lower end of the resistor 20 is connected to a point being at a potential of, for example, —6 v. to ground, so that the grid of the final tube has the correct negative bias voltage. However, this may, as an alternative, be obtained with the use of a parallel combination of a resistor and a capacitor in the cathode lead of the final tube. The capacitor 28 serves to by-pass the intermediate-frequency voltages appearing at the screen-grid.

The various elements of the circuit-arrangement described above have the following functions: the resistor 14 is required to supply a certain negative bias voltage to the control-grid of the tube 2 in the absence of a signal. This bias voltage is produced by the flow of a low grid current. This resistor must, however, be shunted by a capacitor 13 in order to permit the low-frequency signals to pass. The choke 15 has an inductance of 1 to 2 mh. and is, inter alia intended to minimize the intermediate-frequency coupling between the detector circuit and the input circuit. Finally the resistor 16 serves to eliminate the aforesaid alternating-current resistance direct-current resistance distortion. If this resistor were left out, the capacitor 26 would be direct parallel to the detection resistor, so that a serious distortion would occur. However, this resistor may not be too large, since otherwise the high notes would be suppressed to an excessive degree, as the resistor 16 and the capacitor 26 constitute a filter for these notes. This resistor will therefore in general be in itself insufficient for the intermediate-frequency decoupling. This is provided by the inductor 15 together with the said resistor. In the circuit-arrangement described above it has been found to be readily possible to make such a compromise that a satisfactory decoupling is ensured without excessively affecting the reproduction of the high notes. In view of the comparatively low value of resistor 16, the values of resistors 10 and 11 are chosen to be such that the ratio between the alternating-current to be such that the ratio between the alternating-current resistance and the direct-current resistance for the detector circuit maintains a sufficiently high value.

It is known per se to derive the amplified low-frequency voltage from the screen-grid circuit in reflex receivers; this has the advantage in the circuit-arrangement described above that the hum voltage at the grid of the final tube is reduced below that found in conventional circuit-arrangements, in which the amplified low-frequency voltage is derived from the anode of the reflex tube. The resistor 18 included in the screen-grid lead is materially larger than an anode resistor ever could be. The internal resistance of the triode formed by the grid and the screen-grid of the tube is furthermore low and that of the pentode portion is very high. Consequently, the anode has a higher hum voltage (initiating from the not completely rectified supply voltage) than the screen-grid.

Consequently, if the low-frequency signal is taken from the screen-grid, a lower hum voltage becomes operative at the control-grid of the final tube than in many known arrangements. The use of the screen-grid for this purpose is also desired with a view to further voltage variations in the anode voltage lead, which might give rise to periodic setting out of the tube.

More particularly, if the bias voltage of the control-grid of the tube 2 varies with the mean carrier-wave amplitude, anode and, as the case may be, grid detection occurs in the circuit-arrangement described above in the case of strong signals, since the portion of the tube characteristic utilized is, in this case, strongly curved. It has been suggested to suppress the resultant residual signal by means of a particular negative feed-back; however, owing to phase shifts occurring between the signals this means is not always effective. In this circuit-arrangement described above the residual signal is completely suppressed, since the diode circuit comprises the series combination of two fixed resistors 10 and 11, the low-frequency signal being taken from their common point, while the gain control is effected manually by means of a resistor arranged in a further part of the arrangement.

As may be seen from the circuit-arrangement, a negative grid bias voltage is supplied to the grid of the tube 2 from the same point, from which the low-frequency voltage is taken, i. e. the common point of the detection resistors 10 and 11. Consequently, strong voltage variations across the resistor in the detector circuit during tuning to strong signal are immediately counteracted by corresponding variations of the negative grid voltages of the intermediate-frequency tube. This is a forward control with respect to the low-frequency amplification. Thus, the so-called "flop" is avoided. If the detected signal becomes stronger, also the low-frequency voltage of the tube automatically increases. Consequently, the grid of the tube can never have such a strong signal that the tube is overloaded. This is the case in many conventional circuit-arrangements, in which the low-frequency signal which is fed back is manually adjusted by means of a gain control acting upon the detector resistor. This may result in that the signal becomes so strong that the tube is overloaded and the intermediate-frequency amplification is periodically interrupted. In the circuit-arrangement described above this phenomenon does not occur.

Fig. 2 shows a modification of the circuit-arrangement shown in Fig. 1, which consists in that the resistor 14 is omitted and the common point of the capacitor 13 and the choke 15 is connected through a resistor 25 to a point, from which the automatic gain control-voltage for the preceding tubes is derived. In this case the intermediate-frequency tube 2 will have a certain negative grid bias voltage, even in the absence of a signal. The automatic gain control is, in this case, however, delayed, which may be troublesome.

What we claim is:

1. In radio receiver apparatus responsive to an incoming high-frequency wave amplitude modulated by a low-frequency signal, a reflex amplifier stage including an electron discharge tube having a cathode, a control electrode and an output electrode, an input circuit having one end thereof coupled to said control electrode and tuned to the frequency of said high-frequency wave, an output circuit coupled between said output electrode and said cathode and a first capacitance connecting the other end of said input circuit to said cathode and having an impedance value which is relatively low for the frequency of said wave and relatively high for the frequencies of said signal, means to supply said modulated wave to said input circuit whereby an amplified modulated wave is produced across said output circuit, a detector circuit coupled to said output circuit and including a rectifying element in series with a first resistance whereby said low-frequency signal is developed across said first resistance, and a series network connected between a point on said first resistance and the junction of said input circuit and said first capacitance to supply said detected signal to said tube for amplification thereof, said series network being constituted by a second resistance in series with an inductance having values effectively decoupling said detector circuit from said input circuit with respect to high-frequency wave and a second capacitance having a direct-current path shunted thereacross.

2. In radio receiver apparatus responsive to an incoming high-frequency wave amplitude modulated by a low-frequency signal, a reflex amplifier stage including an electron discharge tube having a cathode, a control electrode and an output electrode, an input circuit having one end thereof coupled to said control electrode and tuned to the frequency of said high-frequency wave, an output circuit coupled between said output electrode and said cathode and a first capacitance connecting the other end of said input circuit to said cathode and having an impedance value which is relatively low for the frequency of said wave and relatively high for the frequencies of said signal, means to supply said modulated wave to said input circuit whereby an amplified modulated wave is produced across said output circuit, a detector circuit coupled to said output circuit and including a rectifying element in series with a first resistance whereby said low-frequency signal is developed across said first resistance, a series network connected between a point on said first resistance and the junction of said input circuit and said first capacitance to supply said detected signal to said tube for amplification thereof, said series network being constituted by a second resistance in series with an inductance having values effectively decoupling said detector circuit from said input circuit with respect to high-frequency wave and a second capacitance having a direct current path shunted thereacross, detecting means coupled to said output circuit to derive from said amplified modulated wave a direct voltage varying in accordance with the mean amplitude thereof, and means to supply said direct voltage through said second resistance and said inductance to said control electrode in a direction opposing changes in the mean amplitude of the incoming modulated wave.

3. Apparatus as set forth in claim 2 wherein said tube has a screen grid electrode, further including means including a potentiometer and a third capacitance to derive the amplified low-frequency signal from the voltage appearing at said screen grid electrode.

JOHAN HENDRIK VAN WAGENINGEN.
JAN SCHREUR.

References Cited in the file of this patent

UNITED STATES PATENTS

| Number | Name | Date |
|---|---|---|
| 2,205,243 | Dome | June 18, 1940 |

FOREIGN PATENTS

| Number | Country | Date |
|---|---|---|
| 17,607 | Great Britain | May 17, 1934 |
| 121,914 | Sweden | June 15, 1948 |